July 15, 1924.
R. A. HEISING
DISTANT CONTROL SYSTEM
Original Filed Sept. 29, 1919  3 Sheets-Sheet 1
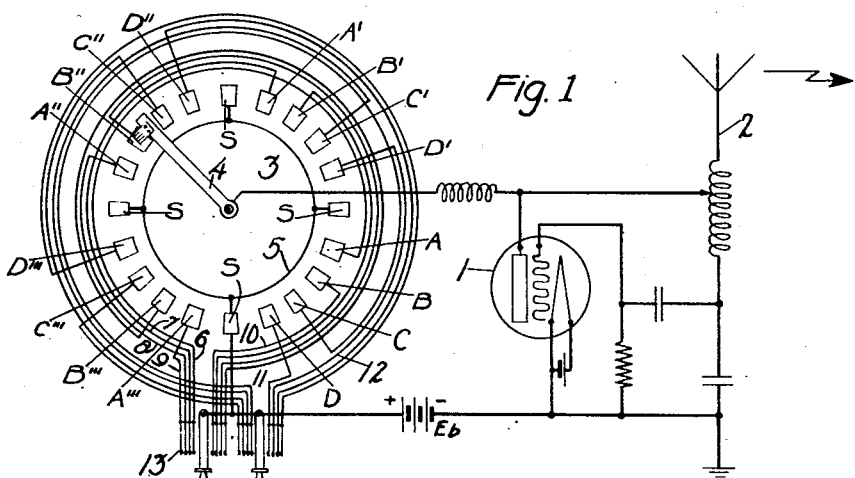
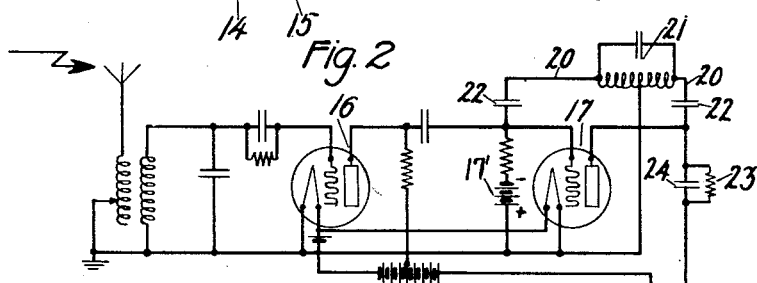
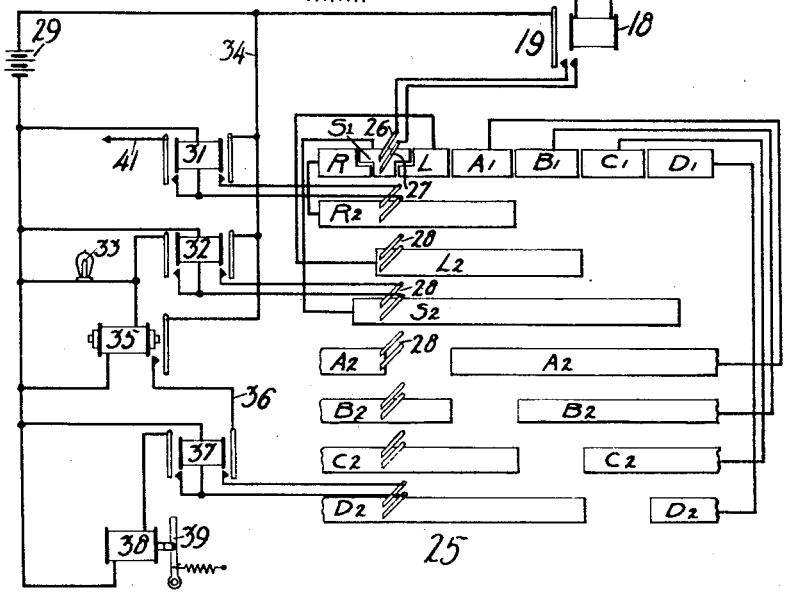
Inventor
Raymond A. Heising
by C. C. Sprague  Att'y Fig. 3         Fig. 4         Fig. 5
  
Fig. 6
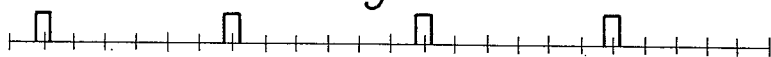
Fig. 7
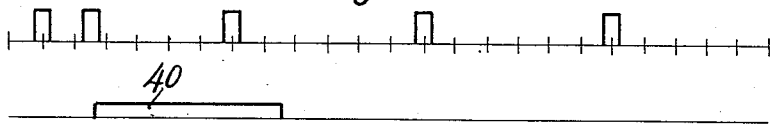
Fig. 8
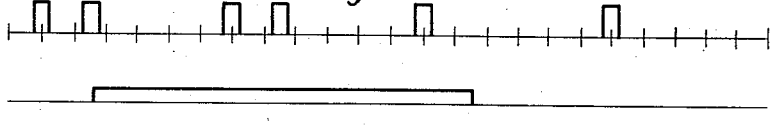
Fig. 9
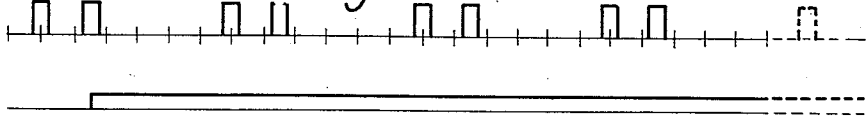
Fig. 10
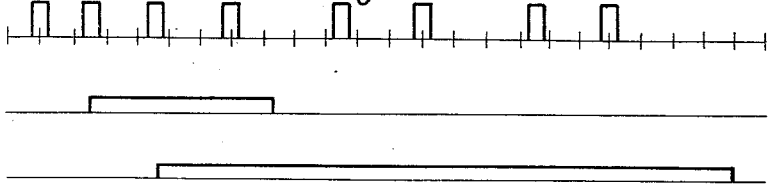

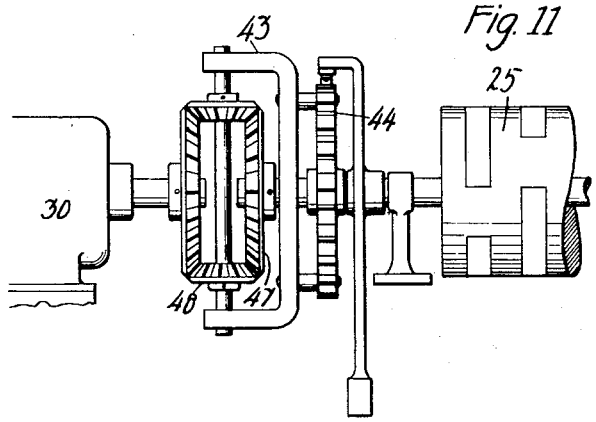
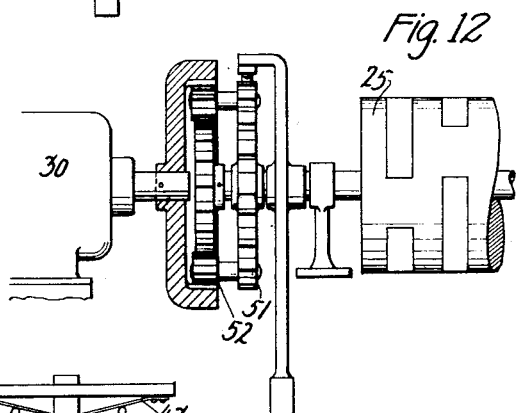
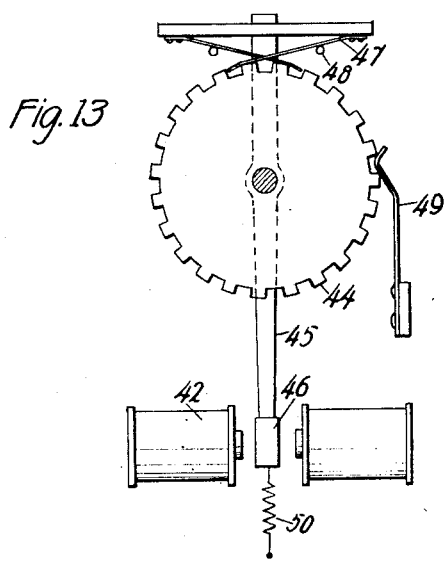

Patented July 15, 1924.

1,501,711

UNITED STATES PATENT OFFICE.

RAYMOND A. HEISING, OF MILLBURN, NEW JERSEY, ASSIGNOR TO WESTERN ELECTRIC COMPANY, INCORPORATED, OF NEW YORK, N. Y., A CORPORATION OF NEW YORK.

DISTANT CONTROL SYSTEM.

Application filed September 29, 1919, Serial No. 327,101. Renewed March 13, 1924.

*To all whom it may concern:*

Be it known that I, RAYMOND A. HEISING, a citizen of the United States, residing at Millburn, in the county of Essex and State of New Jersey, have invented certain new and useful Improvements in Distant Control Systems, of which the following is a full, clear, concise, and exact description.

This invention relates to distant control systems and more particularly to radio systems for determining the course and operation of moving bodies such as aeroplanes.

An object of the invention is to provide means whereby a distant mechanism may be quickly brought under control and operated continuously thereafter.

A further object of the invention is to provide a teledynamic system in which interference with the controlled mechanism by foreign disturbances or other controlling stations may be rendered difficult.

According to this invention, a transmitting apparatus at a control station and a receiving apparatus at a controlled station, as for example an aeroplane, are each provided with continuously moving mechanisms maintained in synchronism by correcting or synchronizing energy periodically sent out by the transmitter. The receiving mechanism serves to cyclically close and open a number of local circuits at the receiving station. A control or operating impulse sent out from the transmitting station serves to operate a particular circuit at the receiving station, depending upon which receiving circuit is in operable condition at that instant. Each of the receiving circuits has a distinct function and it is therefore possible to secure the desired operation at the receiving station by transmitting control energy or oscillations at the proper times.

A feature of the invention is a thermionic amplifier which has normally a zero or small value space current and which, upon receipt of a control impulse, is caused to oscillate and reduce its impedance to space current, thus permitting a large space current to flow.

Another feature of the invention is the means for maintaining the rotary distributors at the transmitting and receiving stations in synchronism.

In the drawing, Fig. 1 indicates diagrammatically a transmitting station; Fig. 2 a receiving station; Figs. 3 to 10 inclusive, are current diagrams illustrating the operation of this system; and Figs. 11, 12 and 13 illustrate details of the synchronizing or correcting mechanism.

Referring to Fig. 1, a vacuum tube oscillator 1 of well-known type is shown associated with an antenna 2. A rotary distributor 3 having a brush 4 driven by a constant speed-motor (not shown), has four groups of contacts each consisting of a synchronizing contact S and four control contacts A, B, C, D; A′, B′, C′, D′; etc. The space current circuit of the oscillator is by way of source $E_b$ to conductor 5, which is connected to each of the contacts S. Brush 4 is directly connected to the anode of the oscillator. When, therefore, the brush wipes over a contact S, space current will flow through the oscillator 2 which will accordingly set up oscillations in the antenna during the time that the space current is flowing. It is clear therefore, that a group of synchronizing oscillations will be sent out each time the brush 4 wipes over a contact S or four times for each revolution of the brush. Contacts A, A′, A″ and A‴ are connected to conductors 6, 7, 8 and 9 respectively, contact B and its corresponding contacts are connected to conductors 10, C to conductors 11 and D to conductors 12. Condutors 6 to 12 inclusive, terminate in groups of contacts 13 associated with controllers 14 and 15. Movement of controller 14 one position to the left into engagement with the contact 13 of the conductor 6, connects contact A to conductor 5. Consequently, as long as controller 14 remains in that position, there will be transmitted a group of control oscillations once during each revolution of brush 4 at the time when brush 4 is wiping contact A. Similarly, movement of controller 14 two positions to the left, connects both contacts A and A′ to conductor 5, thus causing two groups of control oscillations per revolution to be transmitted. There are four positions of controller 14 to the left and four to the right. Controller 15 is correspondingly associated with the C and D contacts and similarly, determines the number of these contacts connected to conductor 5. In the drawing, these controllers are indicated as separate elements but obviously, a single controller having two degrees of motion, as the control stick of an aeroplane, may serve the purpose of both, motions to the left or right connecting contacts A or B to conductor 5, and motions up or down connecting contacts C or D. It is therefore clear that in operation the transmitter sends out four synchronizing impulses or groups of oscillations and that during each interval between successive synchronizing impulses as many as two control impulses are possible, depending upon the position of controllers 14 and 15. Obviously, with more controllers and correspondingly greater number of contacts, a larger number of control impulses for each interval is possible. Moreover, separate controllers may be used for the A and B contacts instead of a single controller as indicated.

Passing now to Fig. 2, the receiving system is shown comprising an antenna preferably tuned to the frequency of the oscillations produced by oscillator 1 and having associated therewith in any desired manner, a detecting device 16 which is connected to the input circuit of a thermionic amplifier 17, in the output circuit of which is a relay 18. The thermionic amplifier comprises a highly evacuated three-element electron discharge device in the input circuit of which is a polarizing source 17'; which normally maintains the grid of the amplifier negative with respect to the cathode. The input and output circuits of this amplifier are coupled by a circuit 20 including a tuned loop 21 and stopping condensers 22. A large resistance 22, shunted by a condenser 24, is connected in series with relay 18.

In operation, a group of oscillations radiated by antenna 2 is detected by device 16, which impresses an electromotive force of corresponding duration on the input circuit of amplifier 17. The coupling between the input and output circuits of this amplifier is such as would normally cause oscillations to be produced were the source 17' absent. The effect of the electromotive force, impressed in consequence of a group of received oscillations, is to permit amplifier 17 to oscillate substantially at the frequency of the tuned loop circuit 21. During this oscillating action, the space current impedance of the amplifier tube is greatly decreased. The space current which is normally very small or of zero value, according to the normal negative potential maintained on the grid of amplifier 17, accordingly increases to a considerable value and causes normally inoperative relay 18 to become sufficiently energized to pull up its armature 19 which engages both its associated contacts. The oscillations of amplifier 17 once started build up to full value and finally the rectified grid current causes the potential on the grid to become sufficiently negative to stop the oscillations. Condenser 24 is of sufficient capacity to provide a low impedance for the first impulse of space current which is needed to make relay 18 operate and to permit the amplifier to oscillate. After the initial rush of current the steady impedance of this circuit is dependent upon the resistance 23 which makes the current through the tube and the relay small when the tube stops oscillating, permitting relay 18 to deenergize. It will therefore be seen that the rectifying action of the grid circuit in making the grid negative and the impedance characteristics of elements 24 and 23 cooperate in causing amplifier 17 to automatically block itself and cease operating. Accordingly, whenever synchronizing or control oscillations are received from antenna 2, relay 18 is energized for a short time and is then automatically deenergized.

Associated with relay 18 is a rotary distributor 25 carrying conducting contactors and conducting segments. This distributor is, for simplicity, indicated merely by the contactors and segments. It makes four revolutions during each revolution of transmitting distributor 3 and this relationship between the motions of the two distributors, hereinafter termed synchronization, is maintained by apparatus operating in response to the synchronizing or correcting oscillations.

Rotary distributor 25 has seven contactors, R, $S_1$, L, $A_1$, $B_1$, $C_1$ and $D_1$ which are successively wiped by two brushes 26 and 27 electrically connected to the contacts of armature 19. Each of these contactors is electrically connected to an electrical conducting segment designated by the corresponding letter with subscript 2, and each of these segments is wiped by a pair of brushes 28 individual thereto. A local source 29 is permanently connected to armature 19 and is associated with the pairs of brushes 28 in such a manner as to close various local circuits according to the times at which receiving relay 18 is energized.

A constant speed motor 30 (see Figs. 11 and 12) drives rotary distributor 25 by intermediate driving gear which can be stepped forward or backward to permit a shift of position of distributor 25 with respect to the motor 30. This driving gear will be later described in detail. A correcting relay 31 serves, when energized, to cause a correcting magnet 42 (Fig. 13) to shift this gear in one direction and a similar correcting relay, when energized, operates to shift the gear in the opposite direction. The ordinary circuits, by means of which the correcting relays energize the magnets 42, are not shown.

The operation of the synchronizing and controlling circuits is as follows:

If distributors 3 and 25 are in step, the synchronizing oscillations will cause relay 18 to energize while brushes 26 and 27 are wiping contactor $S_1$. Armature 19 will pull up, closing a circuit from battery 29, through armature 19, brushes 26 and 27, contactor $S_1$, segment $S_2$, brush 28, relay 32, and back to battery, thus energizing relay 32 which pulls up both its armatures. A circuit is therefore closed from battery 29, in parallel with the winding of relay 32 through lamp 33, left hand armature of relay 32, lower brush 28, segment $S_2$, upper brush 28, right hand armature of relay 32 and conductor 34 to battery. This causes lamp 33 to glow. If the receiving apparatus is located on an aeroplane, this lamp is preferably placed in an exposed position so that it will be visible to the operator at the distant transmitting station and he will be informed that the receiving mechanism on the controlled aeroplane is in synchronism. A slow-acting relay 35 is parallel with lamp 33 is also energized and pulls up its armature to connect battery 29 over conductor 34 to a control circuit 36 to which the right hand armatures of a series of control relays 37, of which one only is shown, are connected. Since the energization of slow-acting relay 35 depends upon the two distributors being synchronized, battery 29 will not otherwise be applied to control circuit 36. This insures against false operation of the control relays.

Suppose that the distributors are synchronized and that relay 35 has been energized. Relay 32 remains energized while brushes 28 are in contact with segment $S_2$ which should therefore be long enough to permit energization of relay 35. Relay 35, when deenergized, releases slowly enough to maintain its armature closed during most of the interval between two successive synchronizing impulses. If, while this armature is closed, a group of control oscillations is sent out as from contact D of the transmitter, the distributor 25 being in synchronism with distributor 3 will have its brushes 26 and 27 on contactor $D_1$, thus energizing the corresponding relay 37. Relay 37 in operating, pulls up its right hand armature, closing a locking circuit for itself from battery 29, winding of relay 37, through brushes 28 and segment $D_2$ to conductors 36, 34 and battery. This circuit remains closed until opened by segment $D_2$, passing from beneath the brushes 28. Relay 37, in pulling up its left hand contact, energizes operating magnet 38 which operates the control mechanism 39. Similar other relays 37 (not shown) are associated with the brushes of segments $A_2$, $B_2$ and $C_2$ respectively. Each of these will be operated provided first, that the distributors are synchronized to permit slow-acting relay 35 to apply battery 29 to common control circuit 36 and second, that control impulses are sent out from the transmitter at the instant when the corresponding receiving contactor is beneath brushes 26 and 27.

Suppose, for example, that controller 15 is moved to the right. If it is moved two points, oscillations will be sent out by D and D′, if four points, by D, D′, D″, and D‴. In the first case, if the distributors are synchronized, operating magnet 38 will be operated during two successive revolutions of distributor 25 and will not be energized during the next two. In the second case operating magnet 38 will be energized throughout the four revolutions. It is therefore possible to have operating magnet 38 energized for one-fourth of the time, one-half of the time, three-fourths of the time or full time. Figs. 4, 3 and 5 respectively, indicate the conditions of one-fourth time energization, one-half time energization and three-fourths time energization of control operating magnet 38. If these periods are sufficiently frequent, the mean effect upon the operating magnet 38 is the same as that of a curent of the average value during the total time. It is therefore possible to cause operating magnet 38 to give different pulls and so to regulate its action on the control mechanism by one-fourth steps. Fig. 6 indicates the relation of the synchronizing impulses sent out during one revolution of rotary distributor 3 to the four control periods immediately following each synchronizing impulse and which correspond to the passage of contactors $A_1$, $B_1$, $C_1$ and $D_1$ beneath the brushes 26 and 27. Fig. 7 indicates the effect of four synchronizing impulses and an A impulse after the first synchronizing impulse. The relay 37 associated with the $A_2$ segment at the receiver holds its control operating magnet 38 energized by an impulse 40 which continues until the time for the $A^1$ oscillations or impulse. However, no A′, A″ or A‴ oscillations are transmitted, and accordingly, during the next three intervals between synchronizing impulses, relay 37 is deenergized. This gives one-fourth time energization of the corresponding control operating magnet 38 and the state of affairs is as indicated in Fig. 4. Fig. 8 shows how an A and A′ group of oscillations in succession produce one-half time energization as indicated in Fig. 3 and Fig. 9 shows how successive oscillations from A, A′, A″ and A‴ produce full time energization of the control operating magnet 38 which is associated with the $A_2$ segment. Fig. 10 illustrates the case where oscillations are sent out by A during the first period and by C, C′ and C″ respectively during the first three periods, thus energizing during one-quarter of the time, the operating magnet 38 corresponding to the A contactors, and for three-quarters of the time, the operating magnet corresponding to the C contactors.

If the two movements of controller 14 be to right and left, control operating magnets 38 of the $A_2$ and $C_2$ segments may, if desired, be arranged so as to cause right and left turning movements of the controlled aeroplane by reason of the action of mechanism 39 upon its vertical rudders and fins. Similarly, right and left movements of controller 15 may operate up and down controls respectively of the controlled aeroplane. Since the magnitude of the control action is dependent upon the position of the controllers or the control stick at the transmitting station, the direction of the aeroplane may be readily controlled. If additional controllers are provided as previously suggested, regulation of the propelling motor on the aeroplane, starting and stopping of the same, bomb dropping operations and other desired effects may be readily secured.

The operation of the synchronizing circuits in the event that the distributors are out of synchronism may now be considered. The controlling operator at the transmitting station watches for the glow of the lamp 33. If the distributors are operating at about the proper relative speeds but are not in the proper phase relation, the lamp 33 will remain unlighted. The operator may then temporarily change the speed of the driving motor at the transmitting station or he may manually shift the distributor 3 about its axis until he sees the lamp glow. The distributor is preferably so constructed that the member carrying the contacts S, A, B, C, etc., may be easily shifted about its axis so as to change its phase with respect to brush 4. This expedites the synchronizing operation. However, it is practically impossible for two independent mechanical devices to maintain exact synchronous operations at high speeds if neither controls the other and the two mechanisms would sooner or later come into the proper phase relation when the synchronizer would begin to operate. Suppose, for example, that the difference in phase is such that when the synchronizing impulse energizes relay 18, brush 26 has just passed on to contactor $S_1$ but brush 27 is still in contact with contactor R. This means that the distributor 25 is slightly behind its proper position. Relay 32 will be energized, as previously described, by a circuit through brush 26. This causes lamp 33 to indicate synchronism and permits the control oscillations during the ensuing revolution to operate their respective control relays. However, brush 27 closes a circuit from battery 29 by way of contactor R and segment $R_2$ through correcting relay 31 to shift the driving gear in such manner as to cause distributor 25 to be stepped slightly ahead. If, however, the distributor were a little in advance of its proper position with brush 27 on contactor L, a circuit would be closed through a similar relay 31 to shift the distributor backward. It will therefore be noted that lamp 33 indicates synchronism provided that brush 26 is upon contactor $S_1$ during the receipt of synchronizing oscillations, but if brush 27 happens to be upon either contactors R or L, a phase correction of the distributor will follow.

Relay 31 is shown with an armature in a local circuit 41 which energizes the proper correcting magnet 42 (indicated in Fig. 13).

Considering Figs. 11 and 13, motor 30 is shown connected to the driving bevel gear 47 of distributor 25 by a differential gear mechanism 48 carried by a yoke 43 loosely mounted on the shaft of distributor 25. Rigidly connected to yoke 43 is a ratchet wheel 44 loosely carried on the distributor shaft and cooperating with a ratchet arm 45 terminating in an armature 46 which is in position to be acted upon by correcting magnets 42. Ratchet arm 45 which is also loosely mounted on the shaft of distributor 25 carries at its upper end two spring pawls which extend in opposite directions toward the teeth of ratchet wheel 44. Stationary pins 48 serve, when arm 45 is moved in one direction, to lift the opposing spring pawl and permit the other pawl to carry the ratchet wheel 44 with it, thus shifting arm 43 and correcting the phase of the distributor. A friction device, indicated as a stiff spring 49, prevents accidental movement of yoke 43 and holds it against rotation, due to the transmission torque exerted by motor 30, but permits correcting motion due to the positively acting pawls. When the arm 45 is released by the correcting magnet, it is quickly returned to neutral position by a tension spring 50, the stationary pins 48 permitting the pawls 48 to slide over the teeth of the ratchet wheel without directly engaging them.

Fig. 12 shows a modification of the mechanism of Fig. 11 in which a ratchet wheel 51 carries the connecting pinions 52 of a planetary gear. In other respects the mechanisms of Figs. 11 and 12 are the same.

It is of course to be understood that there may be as many synchronizing contacts S as desired on the distributor 3, depending upon the number of points associated with controllers 14 and 15 and the number of positions which it is desired to give to controlled mechanism 39. Moreover, it is to be understood that although this system has been described as having four controls, there may be as many as desired, it being merely necessary to divide each interval between synchronizing impulses into the desired number of parts and to provide a corresponding number of contacts, contactors, conducting segments and their associated apparatus. The rotary distributors may of course be either of the moving brush or moving contact type. It is to be understood that the apparatus is capable of use for teledynamic purposes generally and wherever selective operation of mechanism or indicating apparatus is desired.

Certain subject matter shown but not claimed herein is being claimed in an application of Arthur A. Oswald, Serial No. 428,948, filed December 7, 1920.

Although the invention has been illustrated and described as embodied in particular circuits and apparatus, it is to be understood that it is not to be limited thereto but only by the scope of the appending claims.

What is claimed is:

1. The method of distant selective control which comprises transmitting a group of oscillations at a selected period within a timing cycle to determine the particular one of a plurality of distant controls to be actuated, and determining the degree of actuation of a selected distant control by the number of successive timing cycles in which said group of oscillations is transmitted at the corresponding selected period of each cycle.

2. In a system of distant control, means to transmit oscillations in selected time divisions of a timing cycle and to repeat the transmission in successive timing cycles at will, a distant receiving station comprising a plurality of control members to be actuated, means actuated in response to the transmitted oscillations in each different time-division of a cycle for causing operation of a different one of said control members, means for maintaining an operated control member in continuous operation through the successive timing cycles in which the transmission of said oscillations is repeated in the selected time-division corresponding to the operated control member, and means to cause the cessation of operation of an operated control member within the same timing cycle in which no oscillations are received during the time-division corresponding to that control member.

3. A distant control system comprising a radio transmitter, a radio receiving station, means at the receiving station operated in response to energy from the transmitter to cause a plurality of different and non-interfering applications of force over-lapping in time duration, and means at the transmitter for determining the respective average strengths of the separately applied forces.

4. In a system including distantly separated transmitting and receiving stations each employing a moving member, means to drive the member at one station comprising a motor and a device for transmitting driving power from the motor to the moving member comprising a differential gear having a pinion secured to the motor and a second pinion secured to the moving member and a yoke containing gear means engaging both of said pinions, and means responsive to correcting impulses controlled by the distant moving member for acting on the yoke associated with the moving member at said one station to shift the phase of the moving member at that station relative to its driving motor.

5. A vacuum tube oscillator having coupled input and output circuits, a space current circuit therefor, means to apply a steady polarizing electromotive force to the input circuit to prevent oscillations, means to impress received impulses upon said input circuit to permit said oscillator to oscillate, and means to check the production of oscillations after the termination of the received impulses.

6. A vacuum tube oscillator having coupled input and output alternating current circuits and a space current circuit including a large resistance shunted by a condenser, means for impressing a steady potential on said input circuit to prevent production of oscillations, means for impressing received impulses on said input circuit to overcome said potential and permit oscillations, thereby increasing the space current, said resistance having such magnitude as to limit the space current and check the production of oscillations shortly after the termination of the received impulses.

7. A teledynamic receiving apparatus comprising a series of contactors arranged to be traversed in sequence by a common brush, a series of conducting segments associated respectively with said contactors and each arranged to be traversed by an individual brush to close a local circuit associated therewith, means controlled by an impulse received when one of said contactors is engaged by the common brush to energize the local circuit of the associated conducting segment and to maintain it energized thereafter as long as said segment remains in engagement with its individual brush.

8. A rotary distributor having a brush and a face member having a plurality of contacts, means for causing substantially uniform relative motion between said brush and said face member whereby the brush engages said contacts in sequence, a vacuum tube oscillator having a space current circuit permanently completed through the brush and certain of the contacts in series, and means to connect other contacts in different arrangements in the series space current circuit thus determining the periods of oscillation of said oscillator.

9. A teledynamic system comprising a controlled moving element and means thereat to synchronize said element with a distant moving element, means to cause said controlled element to initiate various control operations in accordance with received impulses, means for causing said synchronizing means to correct the relative phase difference of said elements when it exceeds a given amount and to permit initiation of said control operations only when the relative phase difference of the elements is less than a small fixed amount.

10. In a synchronously operating system, transmitting and receiving mechanisms, means to maintain synchronism between said mechanisms by impulses periodically transmitted between said mechanisms, means to transmit control impulses following each synchronizing impulse, a plurality of devices associated with the receiving mechanism and adapted to be selectively actuated in accordance with the control impulses, and means dependent upon the receipt of the synchronizing impulse by the receiving mechanism in the proper phase relation, to render the succeeding control impulses effective to actuate said devices.

11. In a distant control system for airplanes and the like having a control member such as a rudder adapted to be displaced desired distances, an operating magnet for applying force to said control member, means to transmit oscillations from a distance to govern the operation of said operating magnet, comprising means to transmit said oscillations at recurring intervals having a selected one of a plurality of time-orders of recurrence, and means actuated in response to the transmitted oscillations for producing intermittent current flow through said operating magnet depending upon the time-order of recurrence of said oscillations to control the average force exerted by said operating magnet on said control member.

In witness whereof I hereunto subscribe my name this 27th day of September, A. D. 1919.

RAYMOND A. HEISING.